C. W. BABCOCK.
CHART HOLDER.
APPLICATION FILED JULY 29, 1919.
1,346,691.
Patented July 13, 1920.
2 SHEETS—SHEET 1.
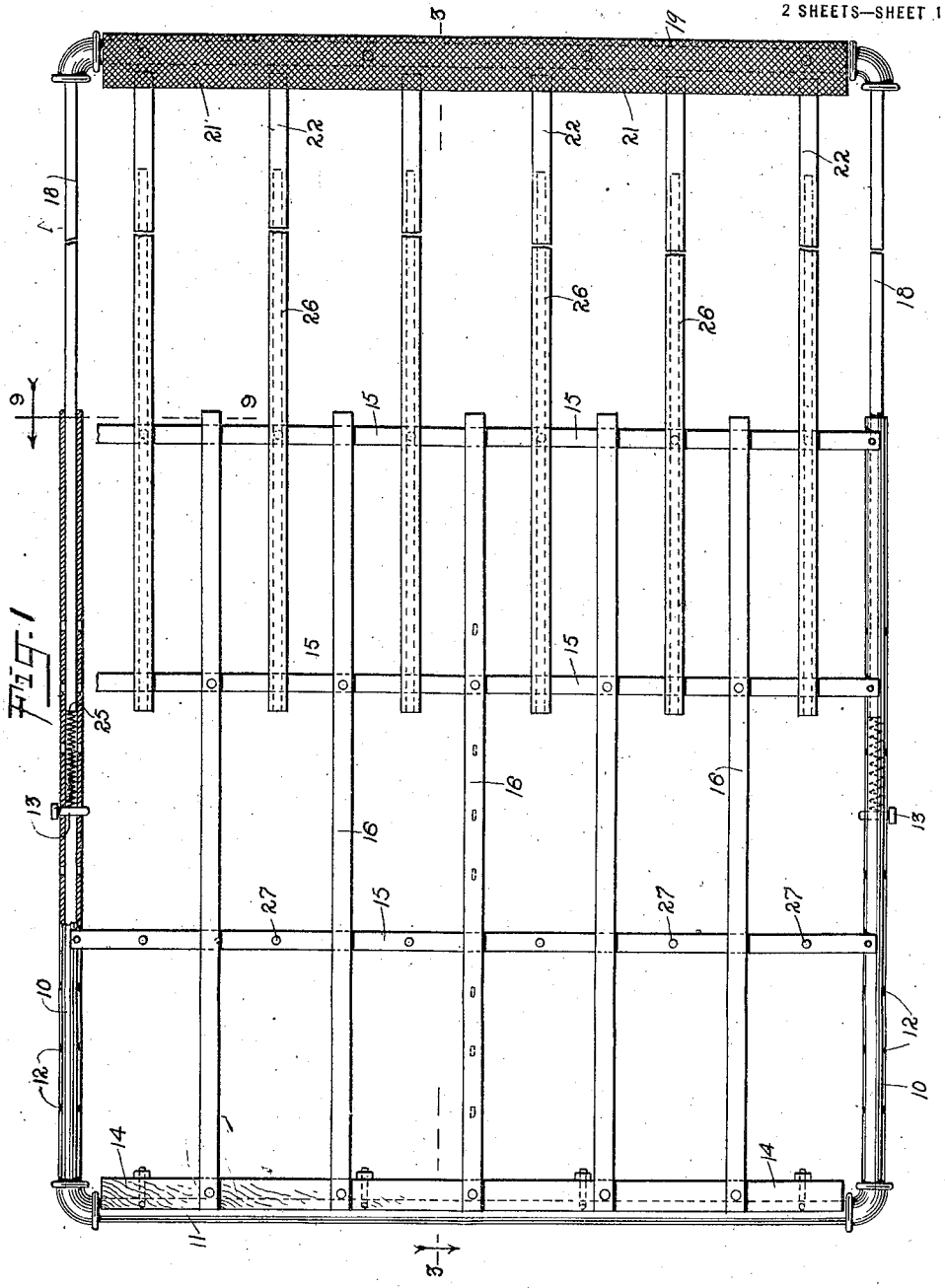
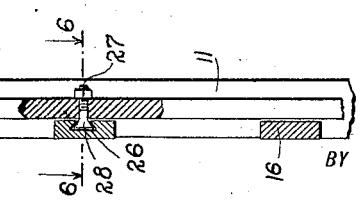
WITNESSES
Wm. P. Loebel.
J. C. Ledbetter
INVENTOR
C. W. BABCOCK
BY
ATTORNEYS

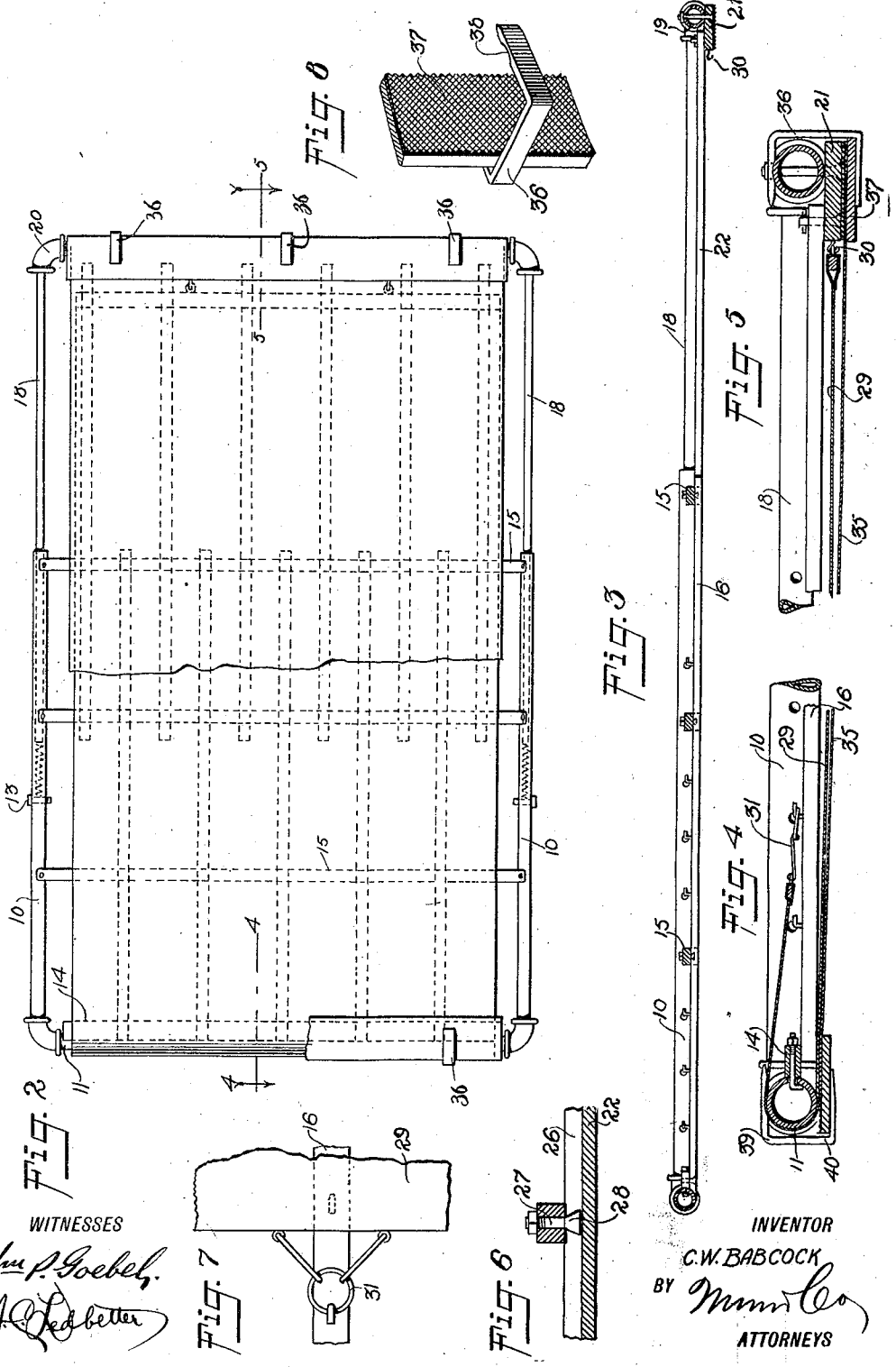

UNITED STATES PATENT OFFICE.

COURTLANDT W. BABCOCK, OF STONINGTON, CONNECTICUT.

CHART-HOLDER.

1,346,691.  Specification of Letters Patent.  Patented July 13, 1920.

Application filed July 29, 1919. Serial No. 314,029.

*To all whom it may concern:*

Be it known that I, COURTLANDT W. BABCOCK, a citizen of the United States, and a resident of Stonington, county of New London, and State of Connecticut, have invented a new and Improved Chart-Holder, of which the following is a full, clear, and exact description.

This invention relates to chart and map holders. The invention portrays means for supporting charts and map holders to be used aboard ships.

An object of the invention is to provide a map or chart holder which may be adjusted to fit various lengths of charts and maps.

It is also an object of the invention to provide an adjustable chart and map holding frame which will be adaptable for use aboard vessels and ships of all kinds, and which will take up comparatively little space. A principal feature of the invention centers in means for supporting and holding in taut condition the map or chart when applied to the chart frame or holder.

Finally, it is an object, with others, to provide a chart holder frame which will be comparatively simple to construct, easy to adjust in size, and convenient in mounting charts and maps thereupon to expose said charts to view during navigation.

With the above principal objects, and others, in view the invention has relation to a certain combination and arrangement of parts, an example of which is disclosed in the following description, pointed out in the appended claims, and illustrated in the accompanying drawings, wherein:

Figure 1 shows a plan view of the chart holding frame with the chart removed therefrom.

Fig. 2 shows a plan view of the chart holding frame with the chart or map sheet attached thereto, and with a fabric backing carried on the frame.

Fig. 3 shows a sectional view taken upon the line 3—3 of Fig. 1.

Fig. 4 shows a fragmentary sectional view taken upon the line 4—4 of Fig. 2.

Fig. 5 shows a fragmentary sectional view taken upon the line 5—5 of Fig. 2.

Fig. 6 shows a detailed sectional view taken upon the line 6—6 of Fig. 9.

Fig. 7 shows a detailed fragmentary view of a certain hook employed for holding taut the fabric backing employed for supporting the chart sheet.

Fig. 8 shows a perspective view of one end of a certain clamping bar employed for fixing the chart sheet to the frame.

Fig. 9 illustrates a sectional view taken upon the line 9—9 of Fig. 1.

A practical example, or embodiment, of the chart holder frame is illustrated in the drawings as above described. The frame may be constructed principally of tubing which carries an inner frame structure of supporting rods made of wood if desired. The primary frame will be composed of two telescoping parts so as to adjust the apparatus in length. Upon this frame is placed a backing sheet for supporting the chart sheet.

Referring more in particular to the drawings, wherein the same parts throughout the several views are designated by identical reference characters, the reference numeral 10 points out two parallel tubes or pipes joined together by a connecting tube 11. The tubes 10 are provided with a plurality of holes 12. A pin 13 is provided for each pipe 10. The pin may be fitted into any of the plurality of holes 12. A wooden bar 14 is secured to the pipe 11 by bolts or other suitable means. A number of cross frame bars 15 have each end attached to the tubes 10. Longitudinal bars 16 have one end thereof fixed to the bar 14 and the other end thereof fixed to the forward bar 15 carried on the forward end of the tubes 10. This frame just described comprises one of the telescoping units of the chart holding rack.

Another frame unit is employed and of similar construction to the one above described. This frame comprises parallel tubes 18 held together and spaced by a tube 19 which may be joined to the tubes 18 by elbow couplings 20. A wooden bar 21 faced with rubber or other suitable material, and preferably corrugated as shown, is fixed to the tube 19 by bolts or other suitable means. Longitudinal bars 22 have one end thereof attached to the bar 21, and rest in a supported relation upon the transverse bars 15 of the other frame unit. The tubes 18 are telescopically confined within the tubes 10 such that the two frame units may undergo a sliding displacement one within the other. This permits the lengthening or shortening of the frame.

A compression spring 25 is confined within each tube 10 with one end thereof abutting the pin 13 and the other end thereof abutting the inserted ends of the tubes 18. This compression spring keeps the two telescoping frame units in outwardly disposed relation. The pins 13 may be adjusted back and forth in any of the holes 12 so as to shorten or lengthen the assembled chart frame. Each longitudinal bar 22 is provided on the underneath surface thereof with a dove-tail groove 26. This construction is shown in dotted lines in Fig. 1 and further shown in Figs. 6 and 9. A bolt 27 is fixed in each transverse bar 15. This bolt will preferably have a dove-tail head 28, and is slidably confined within the dove-tail groove 26. This lines up the parts of the two frame units and makes a stiff and rigid structure. This construction permits the telescoping frame unit 18—22 with its associate frame parts to telescopically engage the other frame unit 12 and transverse bars 15. As the frame units are moved inwardly or outwardly to adjust the length of the chart frame the longitudinal bars 22 are guided upon the transverse bars 15 by engaging the bolt heads 28.

A fabric supporting curtain or fabric backing 29, has one end thereof attached to the rubber faced bar 21 by employing appropriate hooks 30. The other end of this support curtain 29 is passed over the tube 11 and back under the frame. A hook and ring-connection 31 are employed for fixing the support curtain to the underneath side of the central longitudinal bar 16. This support curtain will be drawn in taut relation so as to move the frame 18 into compressive engagement with the spring 25. The outward pressure of the spring will hold the supporting curtain in taut relation causing it to stand in a straight line across the face of the entire length of the frame.

The above description essentially covers the construction of the adjustable chart supporting frame. It will be understood that this frame is primarily designed to accommodate various lengths of charts and maps. The marine officer will adjust the frame to suit the size of the map or chart which he expects to use on a particular voyage. The chart 35 will then be applied to the frame as pointed out in Figs. 2, 4 and 5. One end of the chart 35 is applied to the corrugated rubber face of the bar 21, and the other end of the chart will be placed along the tube 11.

A chart clamping means is employed for quickly and adequately engaging the chart edges along the bar 21 and the tube 11. This clamp is shown in perspective view in Fig. 8, and shown applied to the frame in Figs. 2, 4 and 5. The clamp comprises a spring yoke 36 fixed to a corrugated rubber faced bar 37. This bar 37 is applied to the chart 35, and the yoke clamp 36 straddles the bar 21 and adjacent tube. This yoke clamp 36 forces the bar 37 into close engagement with the bar 21, thus tightly clamping the paper or cloth chart tightly therebetween. One leg of the spring yoke 13 will be an arcuate seat 38 cut therein for the purpose of engaging the cylindrical body of the adjacent tube. A similar clamp is applied to the other end of the chart and tightly clamps the chart to the tube 11. This clamp comprises a similar spring yoke 39 fixed to a clamp bar 40.

The chart or map 35 is held in taut condition between the ends of the frame and rests in supported contact with the support curtain 29. The compression springs 25 act to keep the two frame units in outwardly disposed relation which constantly tightens the support curtain and chart or map 35. This arrangement causes the chart 35 to be placed under slight tension at all times, but the support curtain 29 acts to relieve the chart 35 of any undue tendency to stretch it out of shape or break or rend it at any point.

The clamps 36 and 39 may be removed and the telescoping frame adjusted to any new length and a new chart, either shorter or longer but applied thereto as described.

This adjustable chart frame will adequately fill the present need on board ships for an adjustable chart frame which will be economical in space and quick and convenient in use.

Having thus described my invention, what I claim as new, and desire to secure by Letters Patent is:

1. A chart and map supporting frame, comprising in combination; a frame unit comprising parallel frame bars fitted with tubular receivers, and another frame unit comprising parallel frame bars fitted with tubular inserts telescopically engaging within the tubular receivers of the first named frame unit, a compression spring inserted within the telescoping tube members to engage the inserted end of the tubular inserts, and adjusting pins provided within the tubular receivers of the first frame to engage the compression springs for facilitating the adjustment of the length of the frame, and a support curtain fixed to one end of the frame and passed over the other end of the frame, with means for hooking the free end of the curtain to the underneath side of one frame unit.

2. A chart and map supporting frame, comprising in combination; a frame unit comprising parallel frame bars fitted with tubular receivers, and another frame unit comprising parallel frame bars fitted with tubular inserts telescopically engaging within the tubular receivers of the first named frame unit, a compression spring inserted within the telescoping tube members to engage the inserted end of the tubular inserts, and adjusting pins provided within the tubular receivers of the first frame to engage the compression springs for facilitating the adjustment of the length of the frame, and a support curtain fixed to one end of the frame and passed over the other end of the frame, with means for hooking the free end of the curtain to the underneath side of one frame unit, and a chart applied to the support curtain with the ends thereof attached to the ends of the frame, and clamps engaging each end of the chart.

3. A map and chart supporting rack, comprising in combination; a pair of telescoping frame units adjustably associated so as to vary the length of the chart frame, a chart holder bar applied to one frame unit, with a spring yoke clamp fitted to the chart holder bar for engaging a chart, and a spring yoke clamp fitted to the other end of the frame for engaging a chart, and a supporting curtain arranged to support the chart or map.

4. A map and chart supporting rack, comprising in combination; a pair of telescoping frame units adjustably associated so as to vary the length of the chart frame, a chart holder bar applied to one frame unit, with a spring yoke clamp fitted to the chart holder bar for engaging a chart, and a spring yoke clamp fitted to the other end of the frame for engaging a chart, a supporting curtain arranged to support the chart or map, and provision for lengthening or shortening the support curtain when adjusting the chart frame to various lengths of charts and maps.

COURTLANDT W. BABCOCK.